(12) United States Patent
Ward

(10) Patent No.: US 10,787,262 B2
(45) Date of Patent: Sep. 29, 2020

(54) MODULAR SEAT

(71) Applicant: Textron Aviation Inc., Wichita, KS (US)

(72) Inventor: Barry John Ward, Bel Aire, KS (US)

(73) Assignee: Textron Innovations, Inc., Providence, RI (US)

( * ) Notice: Subject to any disclaimer, the term of this patent is extended or adjusted under 35 U.S.C. 154(b) by 0 days.

(21) Appl. No.: 16/055,339

(22) Filed: Aug. 6, 2018

(65) Prior Publication Data

US 2019/0071182 A1 Mar. 7, 2019

Related U.S. Application Data

(60) Provisional application No. 62/554,288, filed on Sep. 5, 2017.

(51) Int. Cl.
*B64D 11/06* (2006.01)
*A47C 17/17* (2006.01)
*A47C 1/124* (2006.01)
*A47C 11/00* (2006.01)
*A47C 17/16* (2006.01)
*A47C 17/34* (2006.01)
*B60N 2/34* (2006.01)
*A47C 17/175* (2006.01)
*B64D 11/00* (2006.01)

(52) U.S. Cl.
CPC .......... *B64D 11/0641* (2014.12); *A47C 1/124* (2013.01); *A47C 11/005* (2013.01); *A47C 17/16* (2013.01); *A47C 17/34* (2013.01); *B60N 2/34* (2013.01); *B64D 11/062* (2014.12); *B64D 11/0639* (2014.12); *B64D 11/0648* (2014.12); *A47C 17/1756* (2013.01); *B64D 2011/0069* (2013.01); *B64D 2011/0076* (2013.01)

(58) Field of Classification Search
CPC ..... A47C 1/124; A47C 11/005; A47C 13/005; A47C 17/16; A47C 17/162; A47C 17/1756; A47C 17/34; B64D 11/06; B64D 11/0639; B64D 11/064; B64D 11/0641; B64D 11/0648; B64D 11/062; B64D 2011/0069; B64D 2011/0076; B60N 2/34
See application file for complete search history.

(56) References Cited

U.S. PATENT DOCUMENTS

| | | | | |
|---|---|---|---|---|
| 4,217,669 A | | 8/1980 | Fefferman | |
| 5,860,702 A | * | 1/1999 | Pilarczyk | B60N 2/34 297/354.13 |
| 7,938,485 B1 | * | 5/2011 | Perciballi | B60N 2/24 297/216.1 |

(Continued)

FOREIGN PATENT DOCUMENTS

| | | | | |
|---|---|---|---|---|
| CA | 3003026 A1 | * 10/2018 | ........... | B60N 2/2209 |
| DE | 102015114762 A1 | * 3/2017 | ........... | B60N 2/3031 |

(Continued)

*Primary Examiner* — Ryan D Kwiecinski
(74) *Attorney, Agent, or Firm* — Erise IP, P.A.

(57) ABSTRACT

Disclosed is a modular seat for aircraft. The system has a frame that is able to be interconnected with other frames laterally. Since each lateral frame has the same pivot points (when viewed from the side), the linked seats rotate together. The seats also include buckle lugs which enable a particular seat to be used on either side of the aircraft.

16 Claims, 17 Drawing Sheets

(56) References Cited

U.S. PATENT DOCUMENTS

| | | | |
|---|---|---|---|
| 8,011,707 B1* | 9/2011 | Summers | A47C 1/124 |
| | | | 280/47.35 |
| 8,196,236 B2 | 6/2012 | Smythe | |
| 9,056,683 B2* | 6/2015 | Cho | B64D 11/06 |
| 9,144,319 B2 | 9/2015 | Murphy et al. | |
| 9,555,891 B2* | 1/2017 | Fullerton | B60N 2/7011 |
| 9,610,919 B2* | 4/2017 | Taubert | B64D 11/06 |
| 9,629,471 B2* | 4/2017 | Van Hool | B60N 2/34 |
| 10,336,456 B2* | 7/2019 | Ehlers | B64D 11/0696 |
| 2015/0307179 A1* | 10/2015 | Ehlers | B64C 1/20 |
| | | | 244/118.1 |
| 2016/0325838 A1* | 11/2016 | Erhel | B60N 2/34 |
| 2017/0275002 A1* | 9/2017 | Ehlers | B64C 1/20 |
| 2018/0312258 A1* | 11/2018 | Itzinger | B60N 2/3056 |

FOREIGN PATENT DOCUMENTS

| | | | |
|---|---|---|---|
| EP | 1600375 A1 * | 11/2005 | B60N 2/68 |
| JP | 2819115 B2 * | 10/1998 | A47C 11/005 |

* cited by examiner

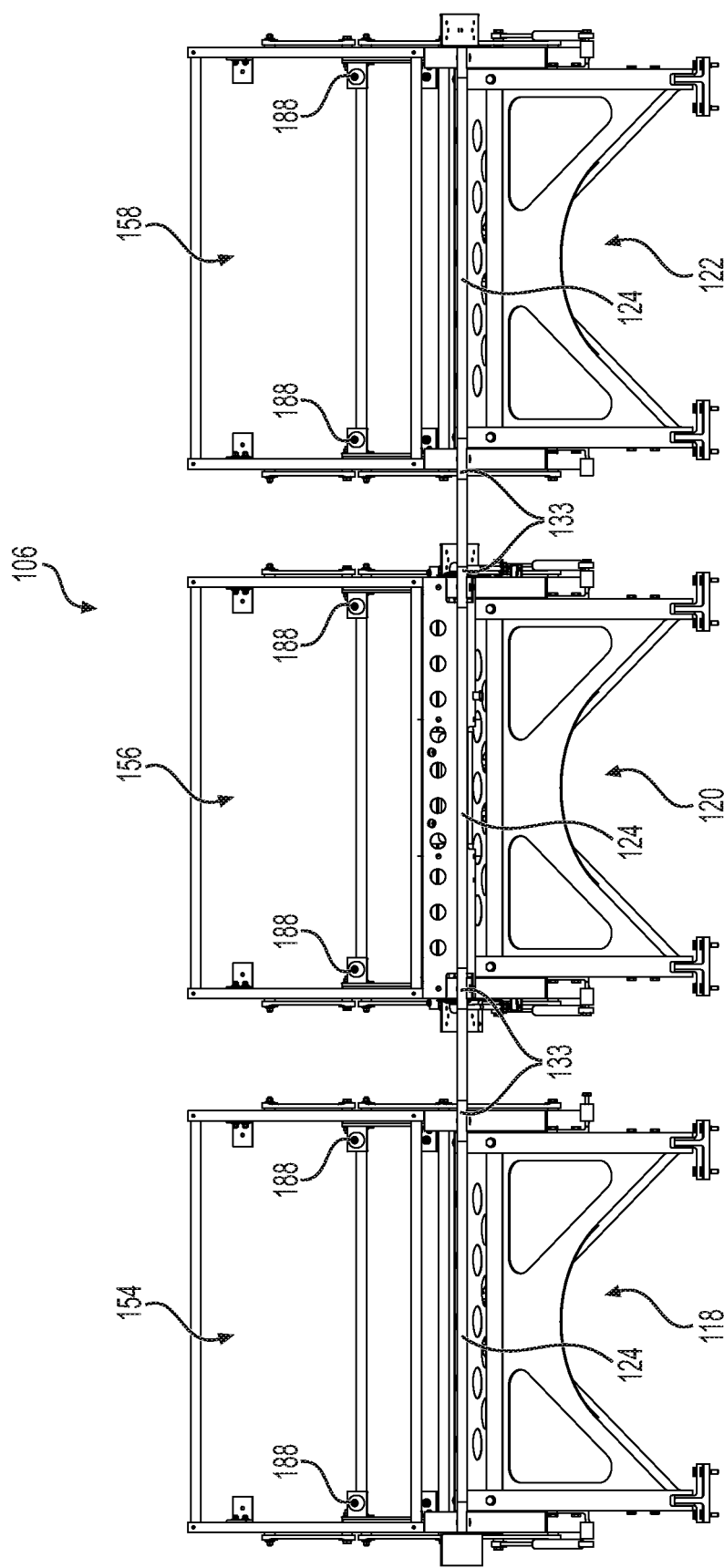

MODULAR SEAT

RELATED APPLICATIONS

This application claim priority to Provisional Patent Application No. 62/554,288, filed Sep. 5, 2017, the disclosure of which is incorporated herein by reference.

BACKGROUND

1. Field

The disclosed system relates generally to the field of vehicle seating. More specifically, the invention relates to seating arrangements convertible into different states to accommodate different needs.

2. Related Art

Vehicle chairs have been known in the art to have the ability to fold out into a bed or like arrangements where the formerly upright back is lowered to present a substantially level resting place for a passenger. For example, U.S. Pat. No. 9,468,303 to Garland discloses an articulated sofa bed with a locking mechanism that may deploy into a bed or sofa. Garland also discloses the use of a torsional-hinge assembly that includes a torsional spring to apply a torque when in a folded position and reduces the lifting force required during deployment.

U.S. Publication 2016/0325838 to Erhel discloses an aircraft divan convertible into a bed. In Erhel a seat pan slides out and a seat back pivots down to lie flat and level. An intermediate or "slouched" position is also disclosed in Erhel.

U.S. Pat. No. 9,144,319 to Murphy et al. discloses a seating unit having a foldable bed. The Murphy seating unit has a base with an internal cavity for storing an intermediate section and a seat section inside the base. Two different linkages have springs for assisting with folding and unfolding.

U.S. Pat. No. 5,860,702 to Pilarczyk et al., U.S. Pat. No. 4,217,669 to Fefferman, and U.S. Pat. No. 8,196,236 to Smythe each also disclose arrangements where seats are converted into beds.

SUMMARY

Disclosed is a modular seating system. In some embodiments, a first seat frame and a second seat frame each including a base which is configured to be selectively securable to an aircraft floor, a removable common linking member spanning across and fixed to each of the first and second frames; the first and second frames being configured to move together between a first mode and a second mode upon the administration of a force applied to only the first frame, and the linking member causes the second frame to move in concert with the first frame when transitioning between the first and second modes. Sometimes each of the first and second frames include a translatable seat portion supported by each base, and the common linking member is secured across the front of each of the translatable seat portions for the first and second frames. Optionally, the common linking member is a bar that is receivable into receptacles formed into each of the first and second translatable seat portions, the bar, when secured, causing the seat portions to solely connect the first and second frame members.

In some versions, a release system is used that has a handle mechanically connected to a pin, actuation of the handle resulting in the pin being unseated from an aperture created in the first seat base enabling a forward translation of the first translatable seat portion. Sometimes the first and second seat portions each have a glide-guiding arrangement comprising front and rear glide tracks created between the first and second seat portions and first and second frames respectively, the glide-guiding arrangement terminating forward movement of the first and second seat portions using one of a forward track end and a rear track end.

In some versions the seats have backs. More specifically, the seat backs include an upper pair of laterally opposed seat-back beams interconnected by some transversely-extending members; a lower pair of laterally opposed seat-back beams interconnected by other transversely-extending members, a lower portion of each of the lower beams being pivotally connected to a rear portion of the translatable seat portion; a first pair of laterally opposed arms together presenting: (i) a first pivot point at a back upper fixed point on the chair base; (ii) a second pivot point near a middle area of each lower beam; and (iii) a third pivot point at a lower portion of the upper beams; and a second pair of laterally opposed arms creating a lower pivot between an upper portion of each of the upper beam members, and an upper pivot between an upper portion of the upper beam and an upper portion of the lower beam.

In embodiments the first mode enables the first and second frames to support one or more cushions in a seating position, and the second mode enables the first and second frames to support the one or more cushions such that they present a substantially horizontal resting surface for a bed.

In some embodiments the seat has a frame removably attachable from a floor of the aircraft; a first set of seat belt lugs on the frame, each including an aperture, the apertures configured to receive the pins of a set of seat belts; a second set of seat belt lugs on the frame, each including an aperture for receiving the set of seat belts; and the first set of seat belt lugs being oriented at a first angle accommodating the use of the set of seat belts when the seat is installed on a first side of the aircraft, and the second set of seat belt lugs being oriented at a second angle accommodating the set of seat belts when the seat is installed on a second side of the aircraft. Sometimes the seat is transformable between a first upright mode and a second collapsed bed mode. Other times lugs are located such that when the seat is transformed into bed mode an attached seat-belt set is stowable underneath a cushion system existing above the frame.

In other embodiments, a system is disclosed for supporting an aircraft occupant, the system including a frame, the frame being convertible from an upright seat mode into a bed mode. In some versions the frame has: a base which is configured to be secured to an aircraft floor; a translatable seat portion configured to be moved in and out; and a seat back portion mechanically connected to the translatable seat portion and configured to collapse on a plurality of hinge points when the translatable seat portion is moved out. Sometimes a linking member which, when installed, spans between and connects the frame to a second substantially similar frame. Optionally the frame and the substantially similar frame are both actuated by a release system coupled with an administration of a force applied to the translatable seat portion of one of the frame and the substantially similar frame. In some versions, the linking member, after actuating the release system, causes the substantially similar frame to move in concert with the first frame when transitioning between the seat and bed modes. In embodiments the plurality of hinge points of the frame are substantially axially in line with the plurality of hinge points of the substantially similar frame, allowing the frame and substantially similar frame to move together in a cross sectional frame.

In some versions each of the frame and substantially similar frame have a seat back, the seat back comprising: an upper pair of laterally opposed seat-back beams interconnected by some transversely-extending members; a lower pair of laterally opposed seat-back beams interconnected by other transversely-extending members, a lower portion of each of the lower beams being pivotally connected to a rear portion of the translatable seat portion; a first pair of laterally opposed arms together presenting: (i) a first pivot point at a back upper fixed point on the chair base; (ii) a second pivot point near a middle area of each lower beam; and (iii) a third pivot point at a lower portion of the upper beams; and a second pair of laterally opposed arms creating a lower pivot between an upper portion of each of the upper beam members, and an upper pivot between an upper portion of the upper beam and an upper portion of the lower beam.

In some embodiments the frame configured to, when introduced into bed mode, support a cushion arrangement such that a substantially horizontal resting area is presented.

BRIEF DESCRIPTION OF THE DRAWING FIGURES

FIG. 7A shows a front view of the FIG. 2 embodiment in the upright state;

DETAILED DESCRIPTION

Figure 1:
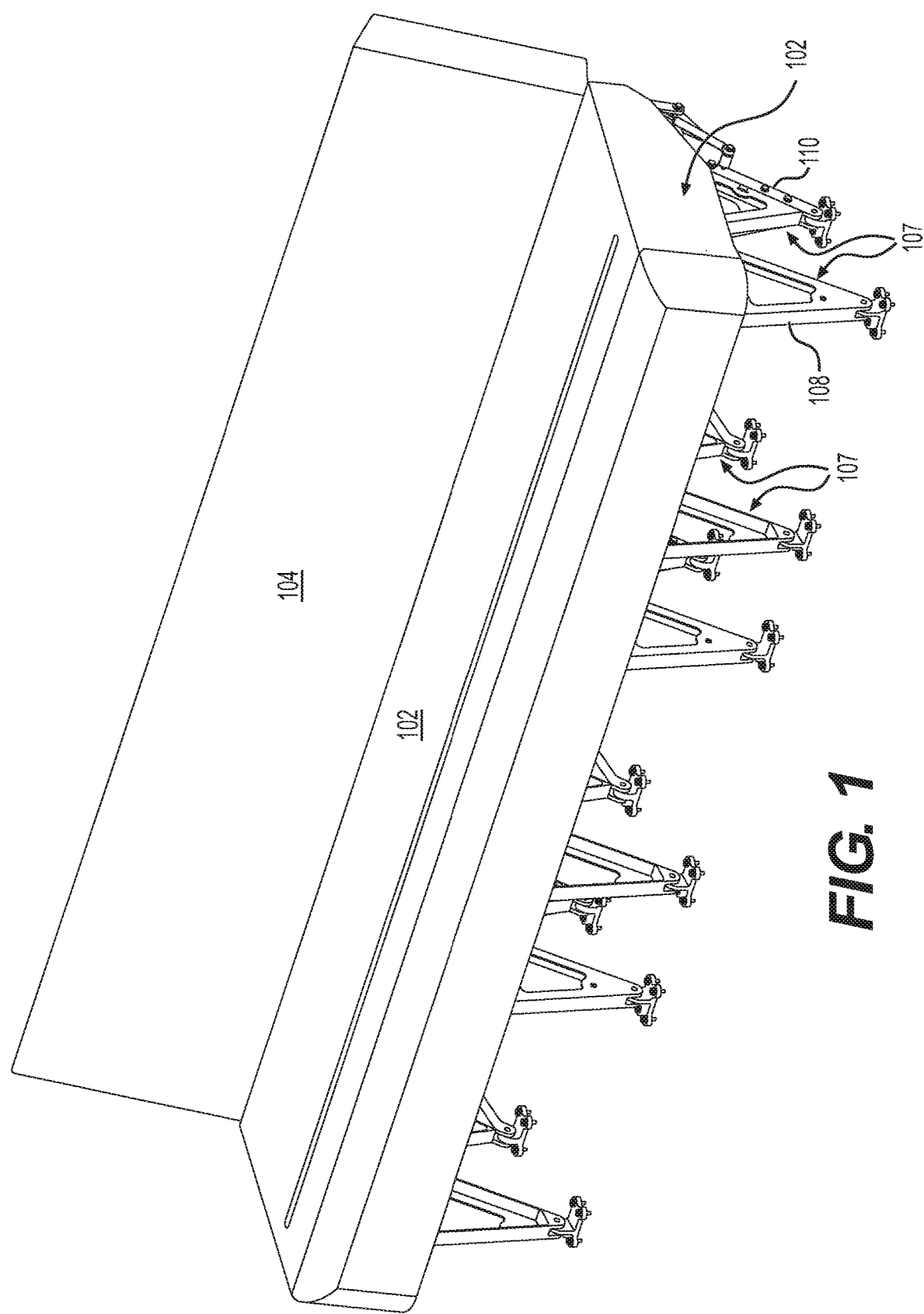
FIG. 1 shows the seat of the disclosed embodiments including cushions.

Disclosed is a seating arrangement for aircraft. The arrangement includes both front and back cushions 102 and 104, which can be seen in FIG. 1. FIGS. 2-13 show a modular frame system 106 with cushions 102 and 104 removed. Frame system 106 includes a rigid support base 107 comprising forward 108 and rearward 110 laterally opposed V-shaped support members (see FIGS. 2 and 5) which depend down from the base 107 and support an upper horizontal frame 109 on which a seat will glide forward as will be discussed hereinafter.

Figure 2:
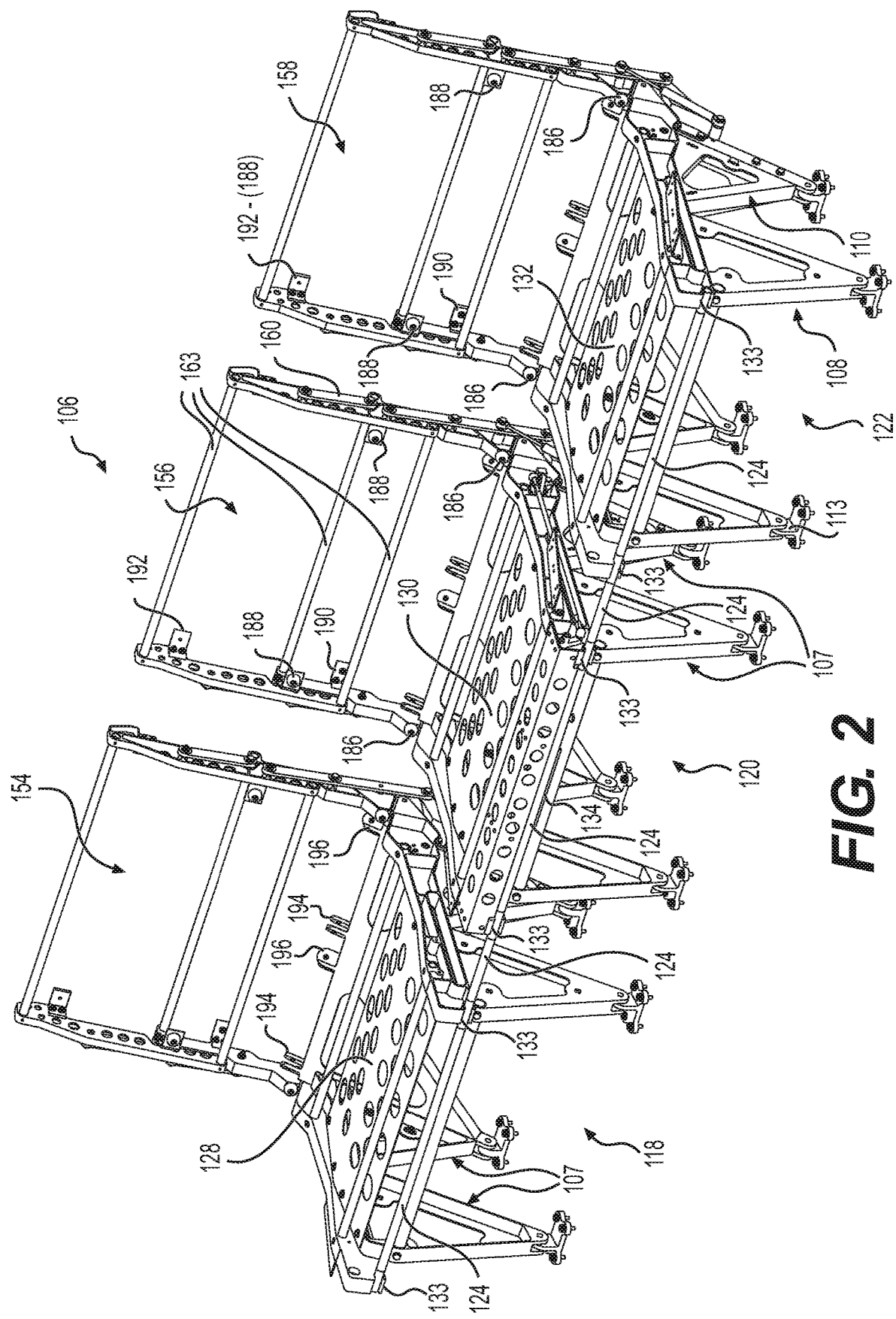
FIG. 2 shows a three-seat modular frame embodiment in an upright position with the cushions removed.
Figure 3:
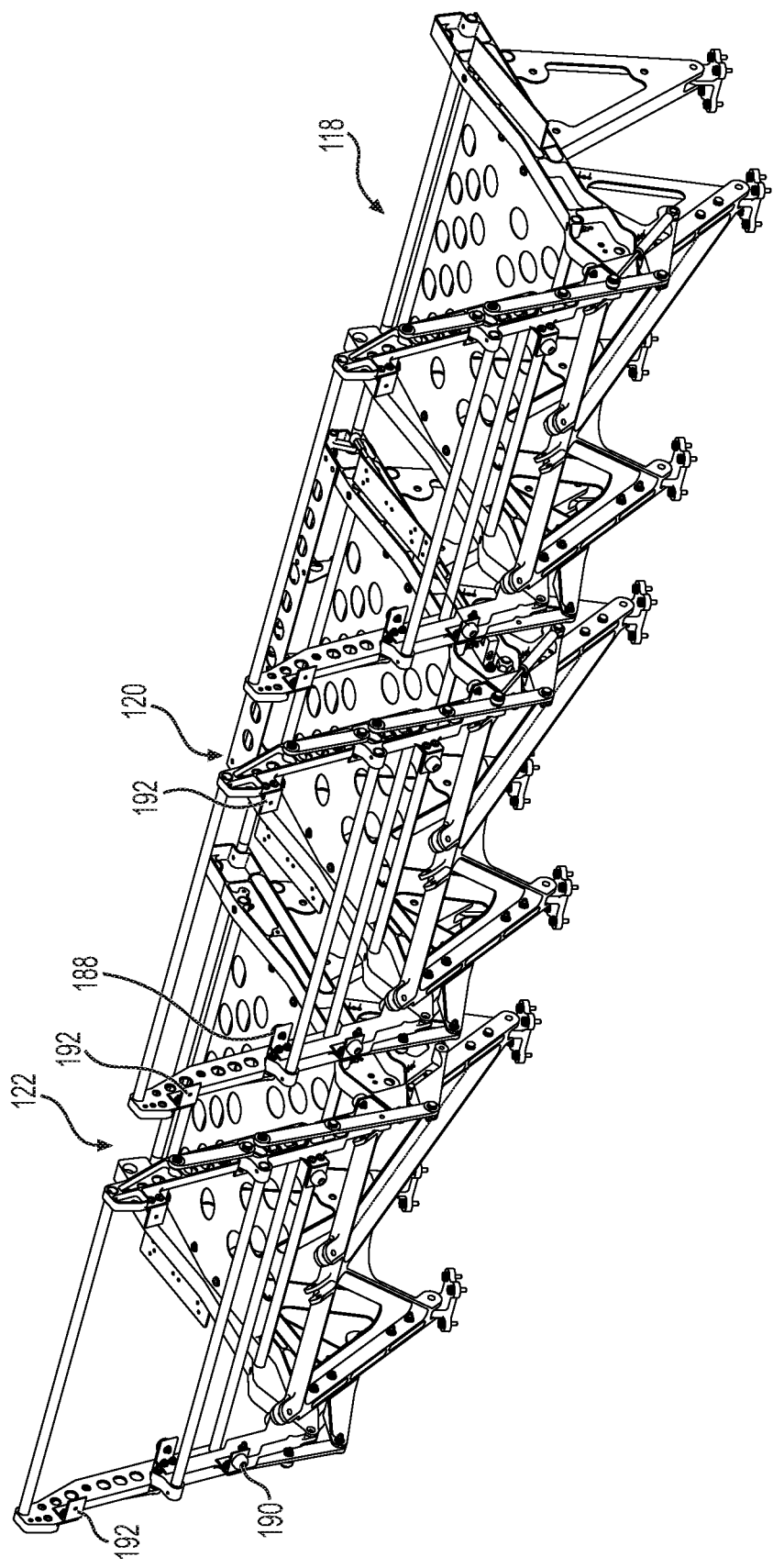
FIG. 3 shows a rear-view of the FIG. 2 embodiment from behind where the seats are in the upright position.
Figure 4:
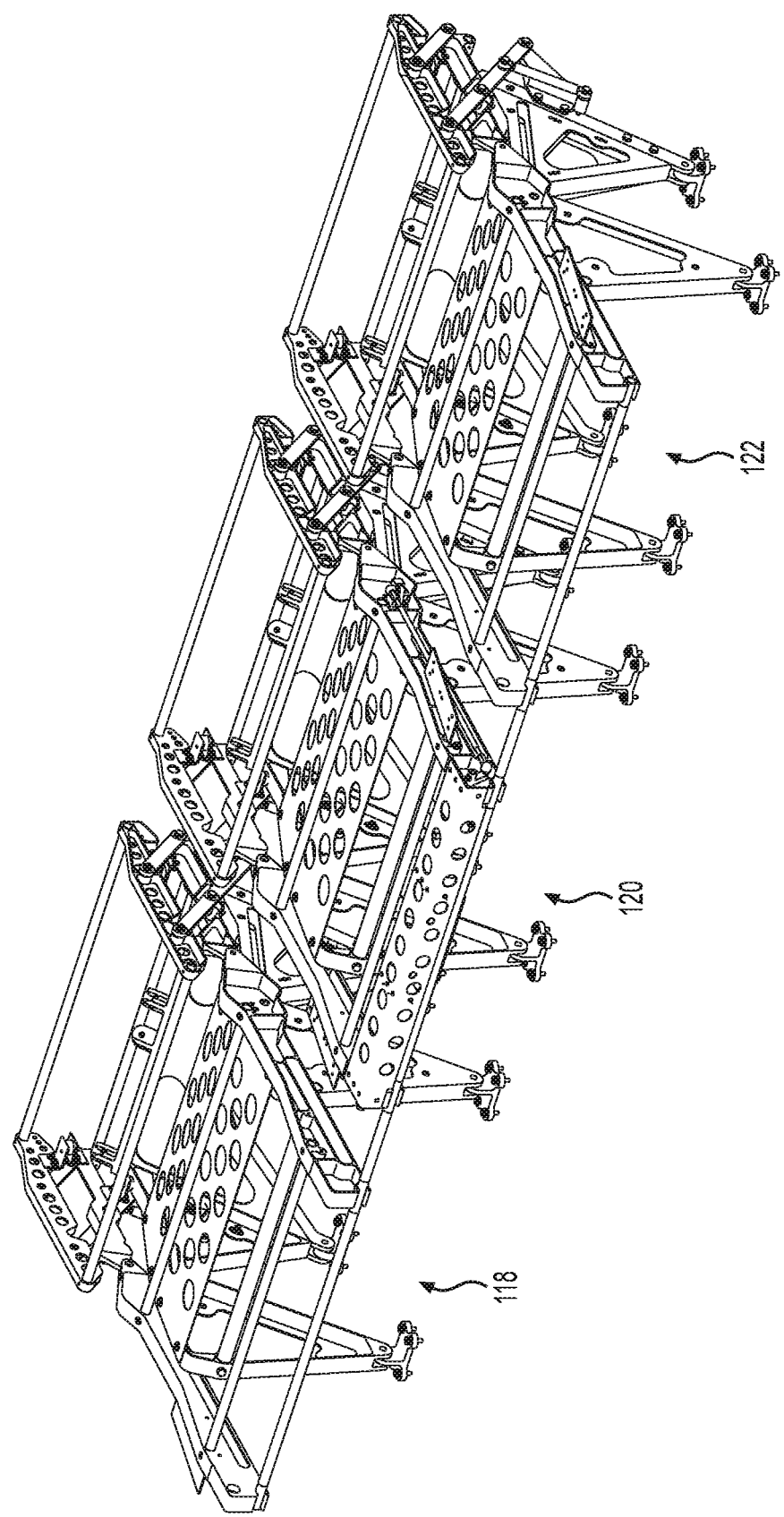
FIG. 4 shows the front perspective view of the arrangement of FIG. 2 where the seats are collapsed.
Figure 12:
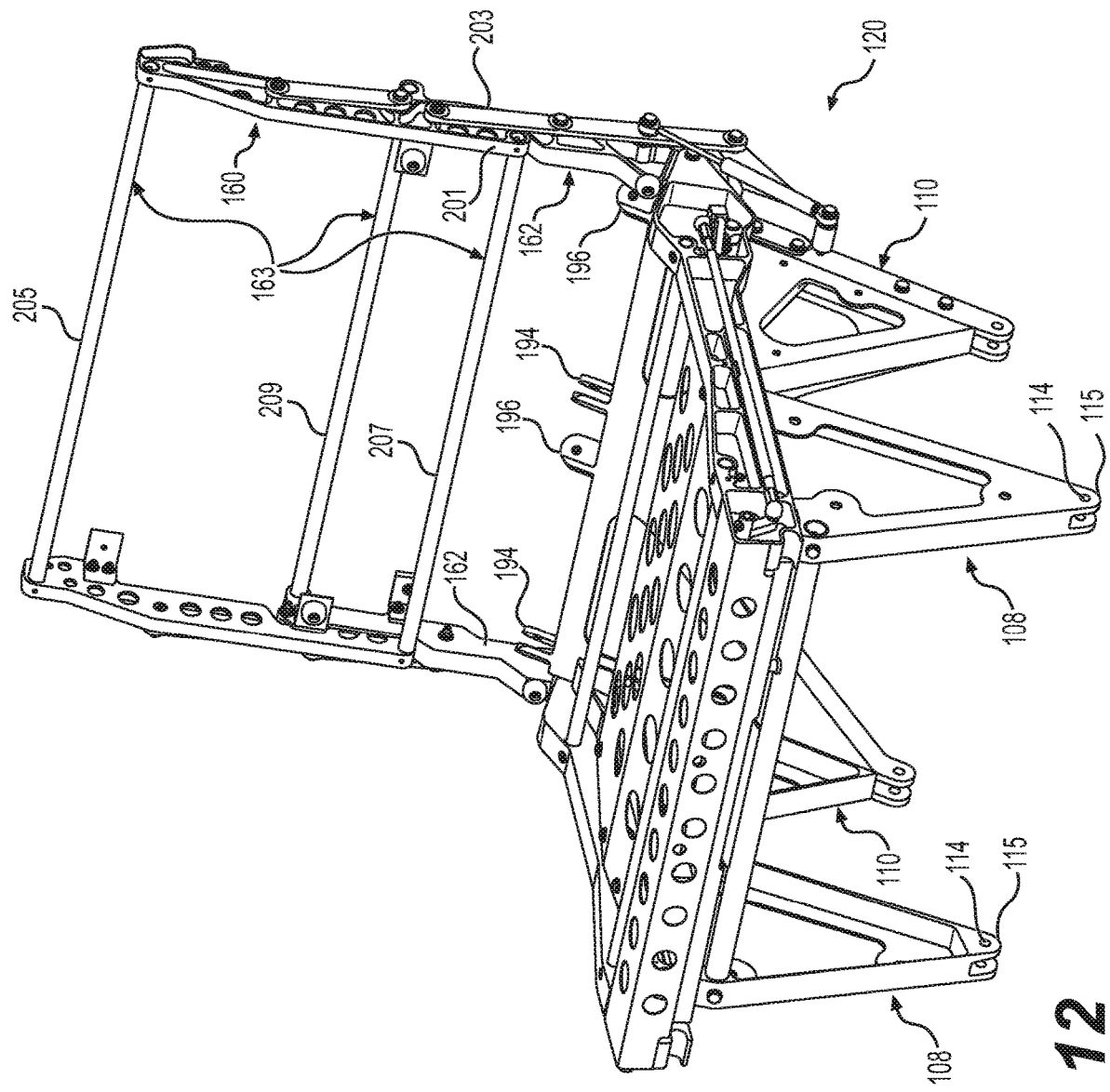
FIG. 12 shows the middle chair of the FIG. 2 embodiment removed from the tabs on the floor of the vehicle.
Figure 13:
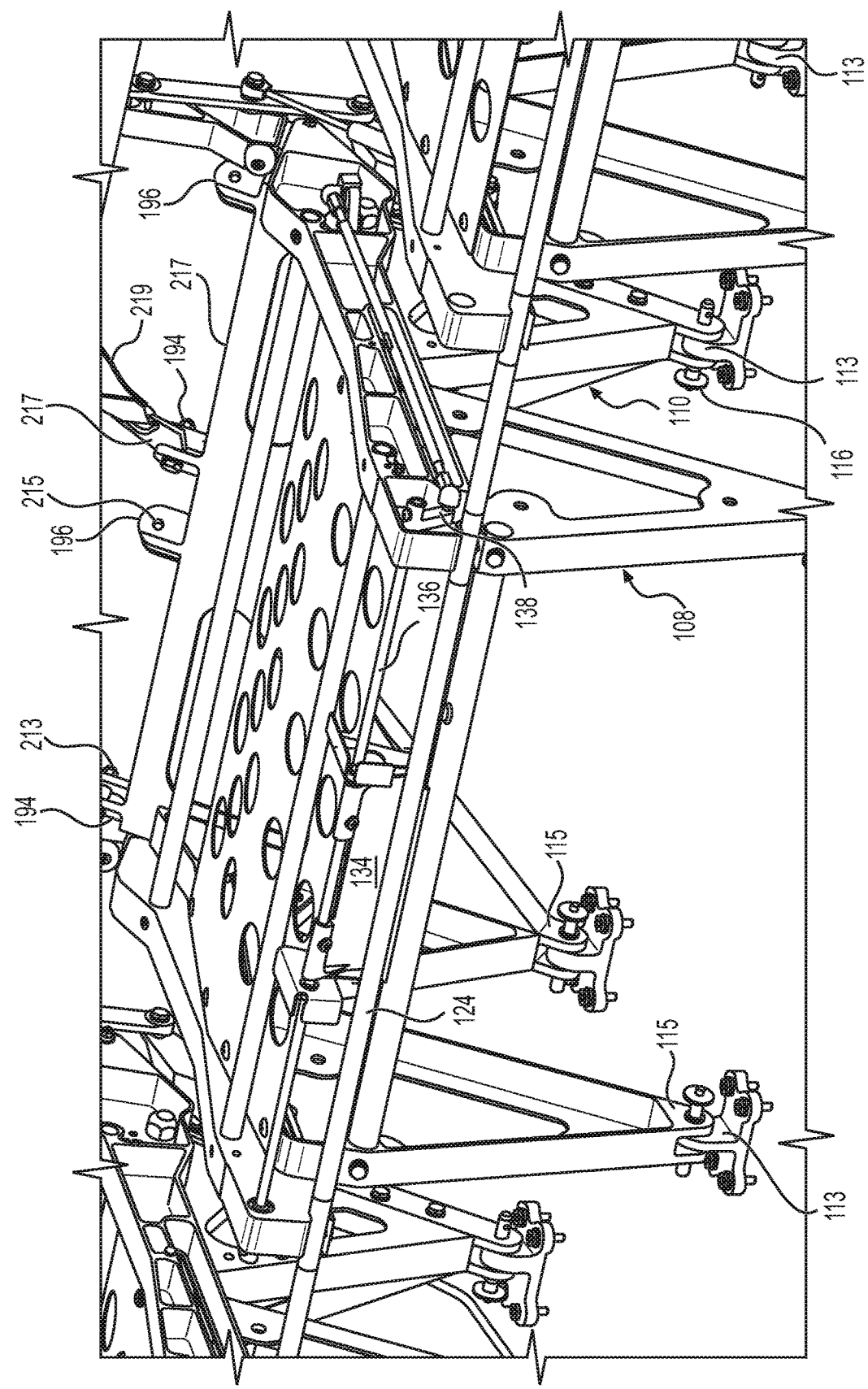
FIG. 13 shows the details regarding the pins and mounting tabs used to secure the chairs to the floor of the vehicle.

The seat system is attached to the floor of the vehicle as follows. Each modular frame included in the frame system 106 includes a base (e.g., base 107) which is made to be removably attachable. Referring to FIGS. 2 and 13, each base is mounted atop conventional tabs 112. Those in the art will recognize that these tabs have upwardly extending flanges 113 which have apertures there-through (not shown) which correspond with apertures 114 (see FIG. 12) made through opposing flanges 115 for accepting receiving quick-release pins 116 (see FIG. 13). Pins 116 are insertable in through the apertures 114 when aligned with the aperture through flanges 113 and extend through to the opposite side to secure the frame to the tabs in a known manner, and can also be removed. Thus, when the pins are installed, the frame system 106 is secured to the floor of the aircraft. Above the tabs 112, inverted triangular supports 108/110 support an upper stationary frame portion 109. The described attachment arrangement enables a user to easily install or remove the individual modular chair sections 118, 120, and/or 122 as desired to create seating arrangements (e.g., rows having certain numbers of chairs).

Once installed, the chairs forming a row, in embodiments, are covered with one or more cushions. As can be seen in FIG. 1A, the front and back seat cushions 102 and 104 our elongated laterally and shared between all the seats, whereas the individual seat frame sections 118, 120, and 122 are separable. But in alternative embodiments, separate rather than integrated cushions could be used.

Figure 11:
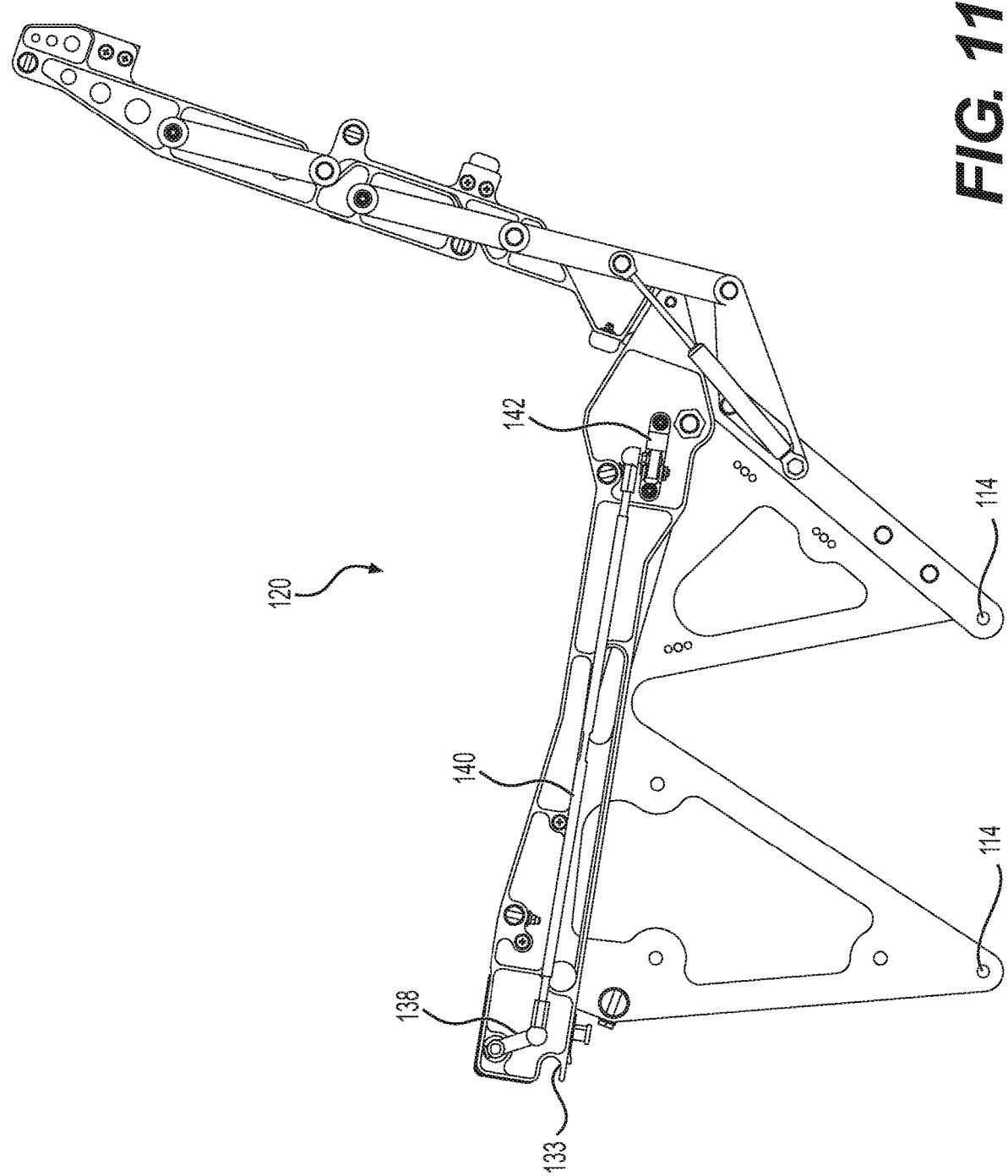
FIG. 11 shows a side view of the release systems of the middle chair in the FIG. 2 embodiment.

Referring to FIG. 2, the three modular seats, 118, 120, and 122, are separate units, but are connected by a linking lateral bar 124 that runs through a receptacles 133 (FIG. 11 shows this with the bar removed) made through the front of each of the seat platforms, 128, 130, and 132. In the disclosed embodiment, the receptacles 133 are at the forwardmost and outermost portions of each individual seat frame. The receptacles 133 have receiving mouths and substantially half cylindrical securement areas and thus, are configured to accept the bar 124. Bar 124 is secured therein at each location by a fastener which, in the disclosed embodiment, is a bolt 127 that is received through a cross bore made through the hollow bar 124 (see FIG. 8). Identical (or similar) fastener arrangements exist at each of the six receptacle locations 133 (one for each side frame). More specifically, the bolt is installed from below and through an upwardly extending bore (see FIG. 8) created in a bottom lip 129 in each channel 133, then through a roof 135 above the channel 133. There, a recessed area receives and exposes the tip of the bolt 127 so that a nut 137 can complete the securement. Alternatively, other kinds of fastener arrangements could be used (e.g., screws). A symmetrical fastening arrangement is created on each opposite side for each of seat frames 118, 120, and 122.

The linking bar 124, once it is fixed in place, constitutes the entire physical connection made between the three chairs. Because the three seats 118, 120, and 122 are connected by the linking bar 124, they are all moved together (e.g., when viewed in the cross sections shown in FIG. 5A-C) when a conversion is made from a standing seat mode into a bed mode as will be described hereinafter.

The modular aspects of the system provide the installer a variety of seat size options since any number of the same chair can be installed based on laterally available space. It is possible to use a single seat like seat 120 (see FIG. 2) individually with front and back cushions 102 and 104 modified (shortened) to fit. With such an arrangement, there is no need to use a bar 124, since the seat 120 has all of the release mechanisms required, and there is no need to couple to a lateral seat.

A two-seat arrangement (e.g., using only seats 120 and 122) is also an alternative arrangement. In this case, only one of the two seats would have to have the release mechanisms. Additionally, linking bar 124 would have to be properly shortened (from the length shown in the figures) to accommodate the combined width of two seats. Alternatively, still, any number of seats in addition to three could be attached to a common linking bar if desired. This would, of course, require the lengthening of the bar to extend to the combined number of chair widths.

All of the modular chair frames attached to the linking bar are able to be locked in place into one of chair or bed modes, and then released to be in the other mode. Because the fronts of the seats are linked, there is only a need for a single release system. For example, in the FIG. 2 embodiment, only middle chair 120 includes a release system. Chair frames 118 and 122 don't need them because they simply move along with, are locked in place, and released along with middle chair 120.

We will now discuss release system which is, in the disclosed embodiment, included wholly within the middle seat 120. The specifics regarding the release system for seat 120 are shown in FIGS. 11 through 13. The system includes a handle 134 which accessed by a user by reaching underneath the front of cushion 102 (see FIGS. 1-2 and 10). Handle 134 is connected to, and when activated, rotates a rod 136. The rotation imparted into rod 136 from the handle 134 is imparted into a lever arm 138. When lever arm 138 rotates, it creates tension in a tension link 140 which is, at an opposite end, connected to a rocker 142. Rocker 142 when pulled by link 140, pulls a release pin 144 (see FIG. 6) out of an aperture 145 formed in the upper portion 107 of the stationary frame. When released, and optionally upon the introduction of force by the user, the seat front 130 moves forward, and a seat back 146 is moved from a first chair mode where the seat frame is in an upright position shown in FIG. 5 into a leveled second bed-mode position shown in FIG. 6. Because all of the seats 120, 122, and 124 are joined by the linking bar 124, they will all move in concert maintaining common relative angular positions relative to the linking bar 124 (conceptually in a cross sectional sense, see FIGS. 5A-C). As a result, the back 104 and seat 102 cushions are supported and move likewise. When the system is fully deployed into bed mode, the frame supports the cushions 102 and 104 such that they maintain a common upper surface that is substantially horizontal (see FIG. 14), and thus, configured to accept the laying down by a user thereon.

Seat track arrangements 141 and 143 are used in guiding the seat portions to enable the upright and bed modes. More specifically, seat platforms, 128, 130, and 132 are each able to slide forward (together) upon release using a forward pair of opposing tracks (symmetrical on each side of each chair). Front tracking system 141 uses cam followers 148 which protrude outwardly from both sides of the upper portion of the stationary frame base 107. The outwardly-protruding cam followers 148 are received in and roll inside slots 150 formed in the outer frame members 152 on each side, and integral with each of seats 128, 130, 132. The slot 150 extends longitudinally through the seat frame member. When the seat is locked in the upright position shown in FIG. 5A, the cam followers 148 are located at the forward-most position in the slot 150. When the seat is locked in the substantially-horizontal position shown in FIG. 5C, the cam followers 148 are located at the rearward-most position. During a mode change, the movement of the cam followers 148 inside the slot 150 on each side of each chair member help guide the seat, with additional help from an oppositely-oriented cam follower arrangement at the back of each seat.

The tracking system 143 at the back of the seat is comprised of opposing symmetrical slots 154 made in either side of the base portion 107 of the lower rigid frame. Opposing inwardly-extending cam followers 156, inwardly mounted on the seat platform frame, are received into these slots 154 on each side of the seat frame. Thus, when the chair is in the upright position shown in FIG. 5A, these pins are in the rearward-most locations 157 of the slots 154 (concealed in FIG. 6, but slot position can be seen in FIG. 5C). And when the chair is in the collapsed position of FIG. 6, the cam followers 156 are in the forward-most position 159 in the slots 154 (slot position is barely visible in FIG. 5). The rear slots 154 are angled slightly upward so that the rear of the seat platform will raise up slightly when the system is placed in bed mode. This helps the seat platform to become substantially level relative to the collapsing back of the chair. The forward and rearward track arrangements 141 and 143 allow for and guide the proper translation of each seat platform (e.g., platforms 128, 130, and 132), and result in the leveling out of cushions 102 and 104.

The backs of the modular frames are capable of folding up to create a substantially horizontal resting plane above the cushions 102 and 104. More specifically, during a move to the substantially horizontal (e.g., bed) position, while the seat platform portions 128, 130, and 132 of each of modular frames 118, 120, 122 are translating forward as described above, the rear-portions of the seats, 154, 156, and 158 are folded up and down as shown by the transition from the state shown in FIGS. 5A-C. Assuming an initial position in chair mode (shown in FIG. 5A) the frame moves into an intermediate mode shown in FIG. 5B. As the frame continues rotation, is terminates in the bed mode shown in FIG. 5C.

Figure 5A:
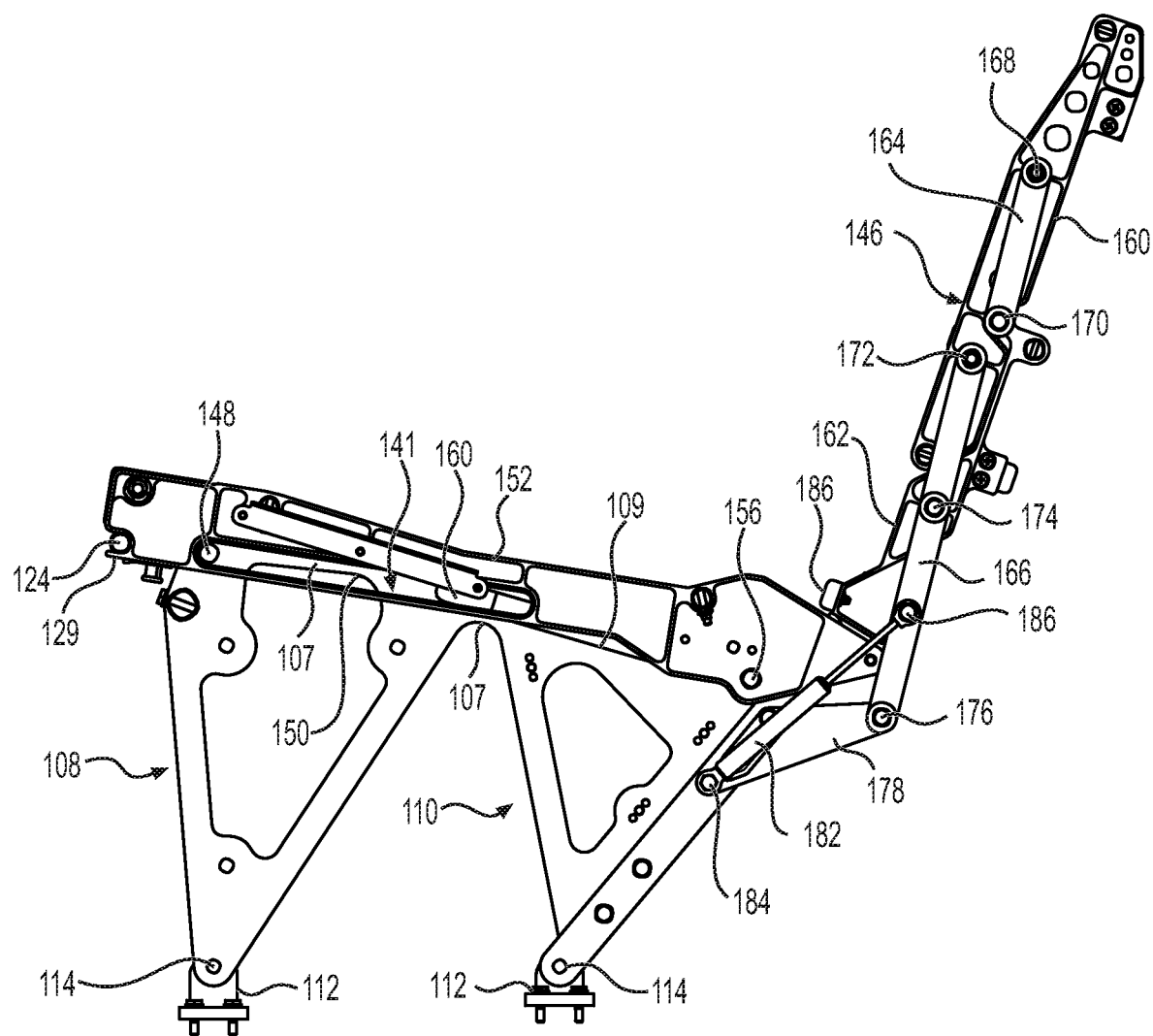
FIG. 5A show a side view of the seat frame in the chair upright mode in the FIG. 2 upright position.
Figure 5B:
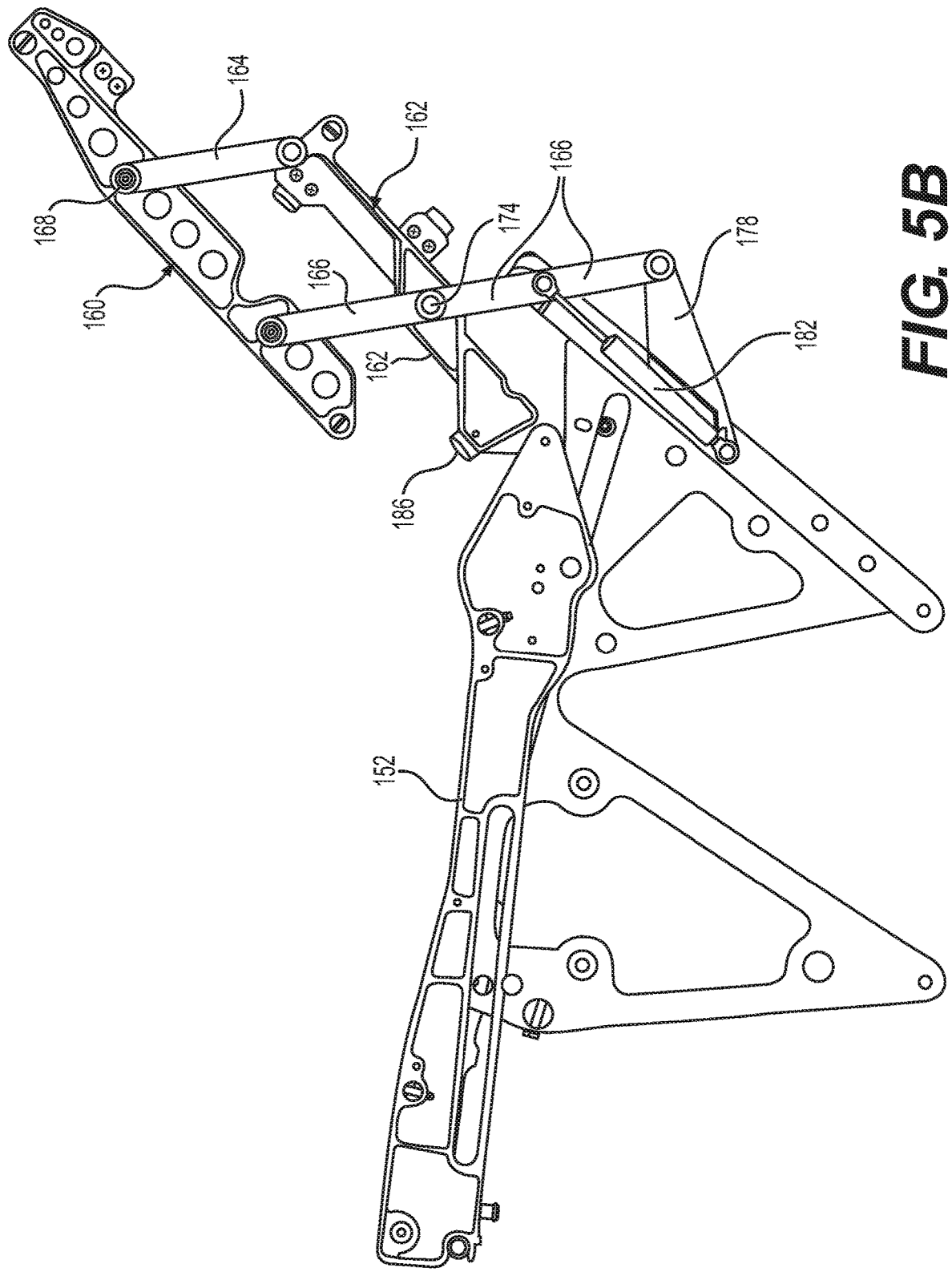
FIG. 5B shows a side view of the seat frame in a middle position between the upright chair and bed modes.
Figure 5C:
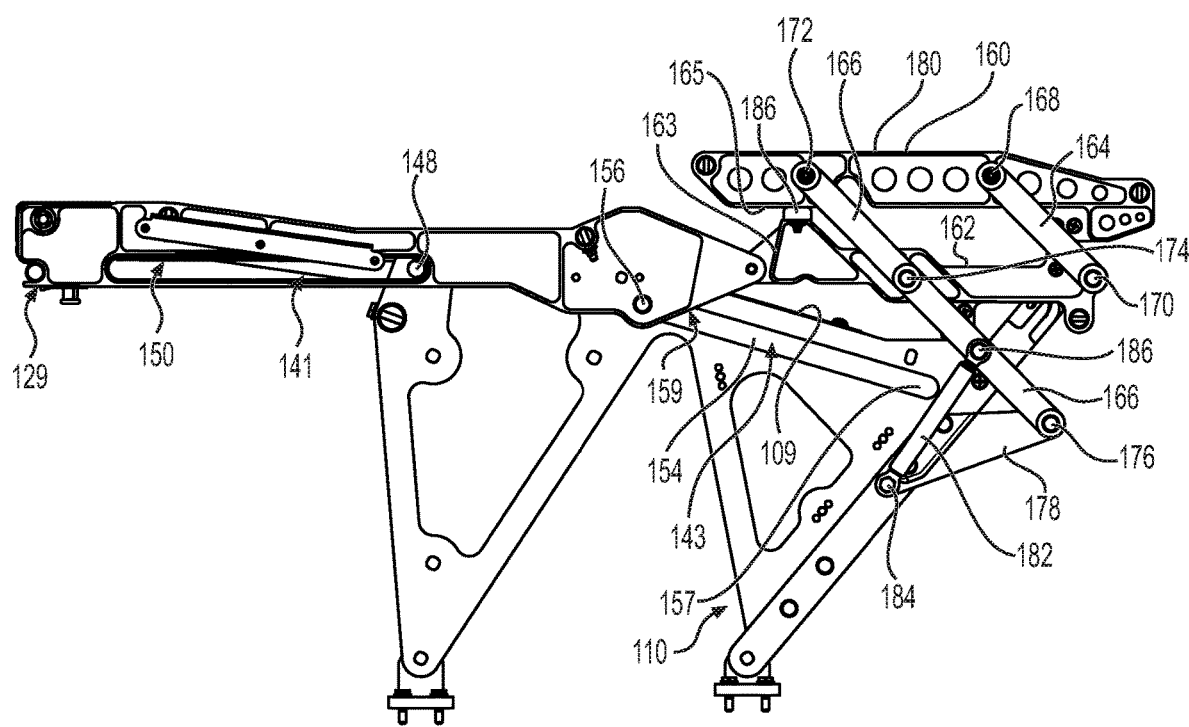
FIG. 5C shows a side view of the seat frame in the collapsed bed mode.
Figure 6:
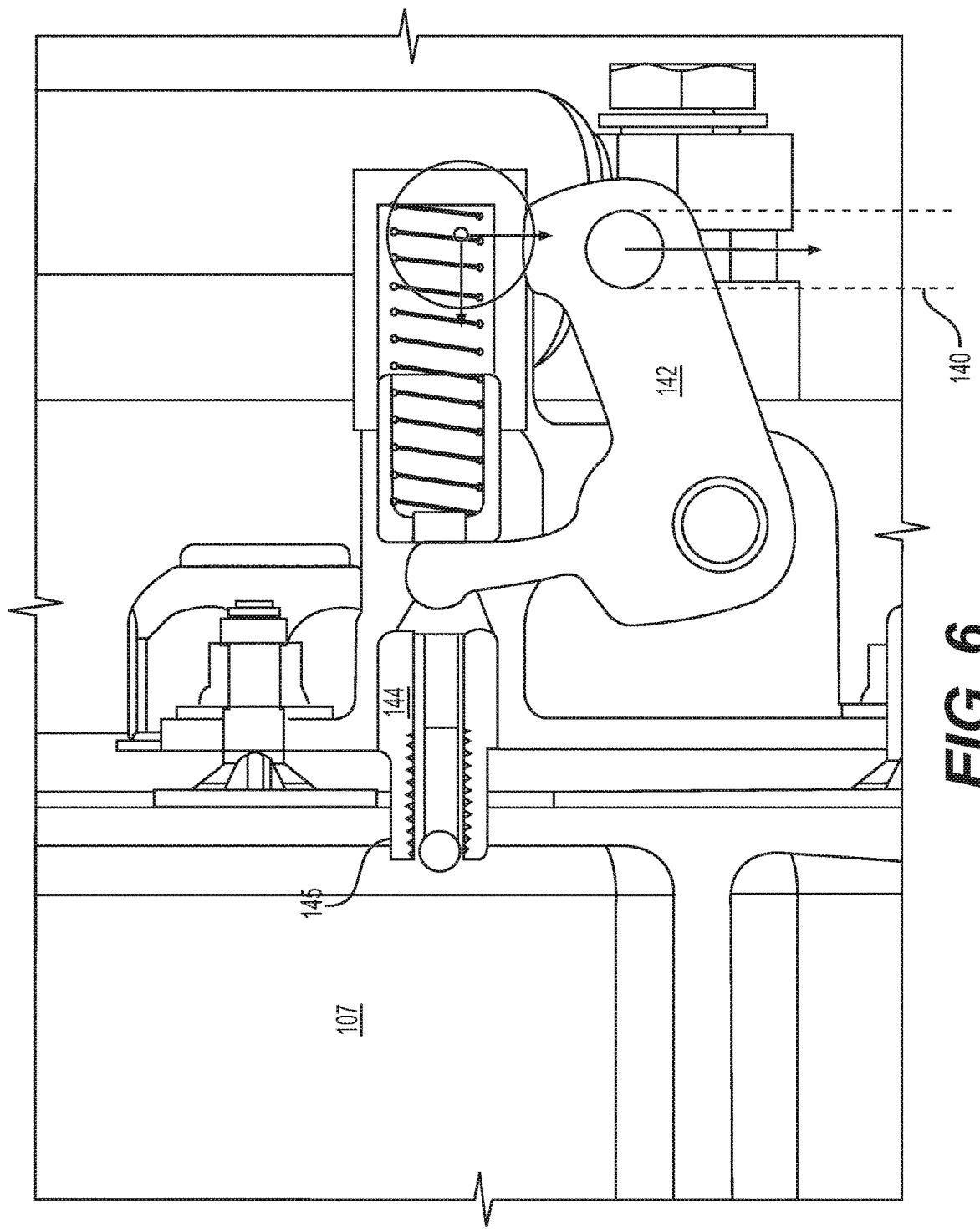
FIG. 6 is a cross sectional view revealing the details of the pin release system.
Figure 7B:
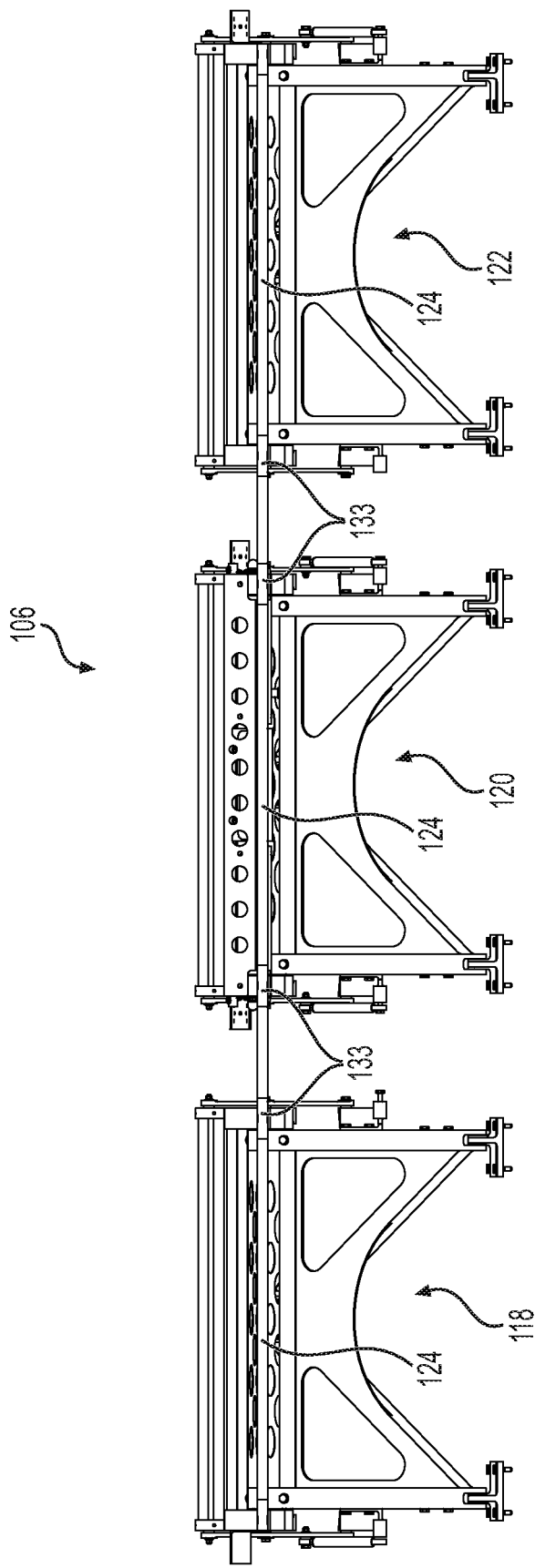
FIG. 7B shows a front view of the FIG. 2 embodiment in the collapsed state.
Figure 8:
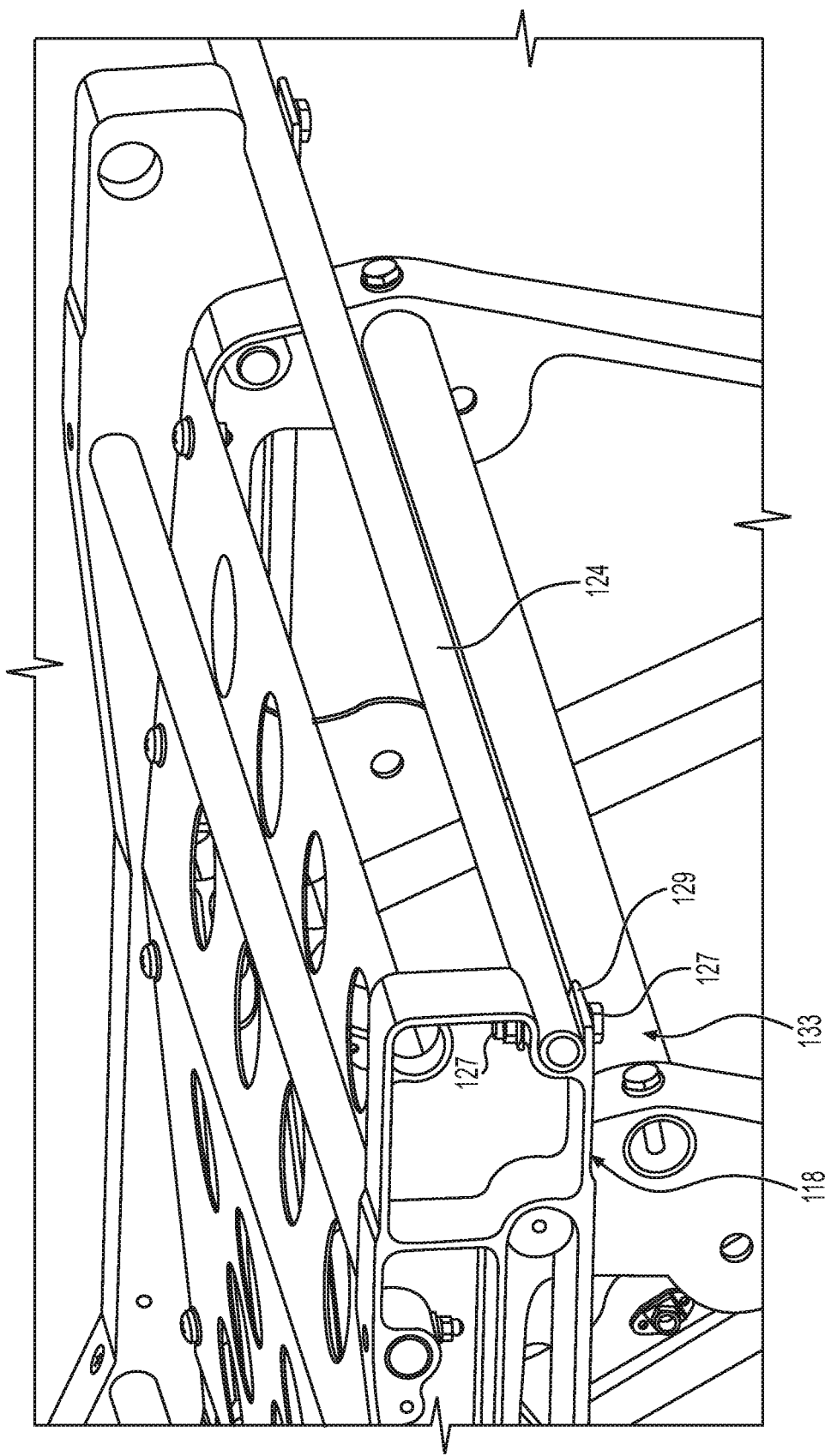
FIG. 8 shows a perspective view including fasteners used to secure the bar between the plurality of chairs.
Figure 9:
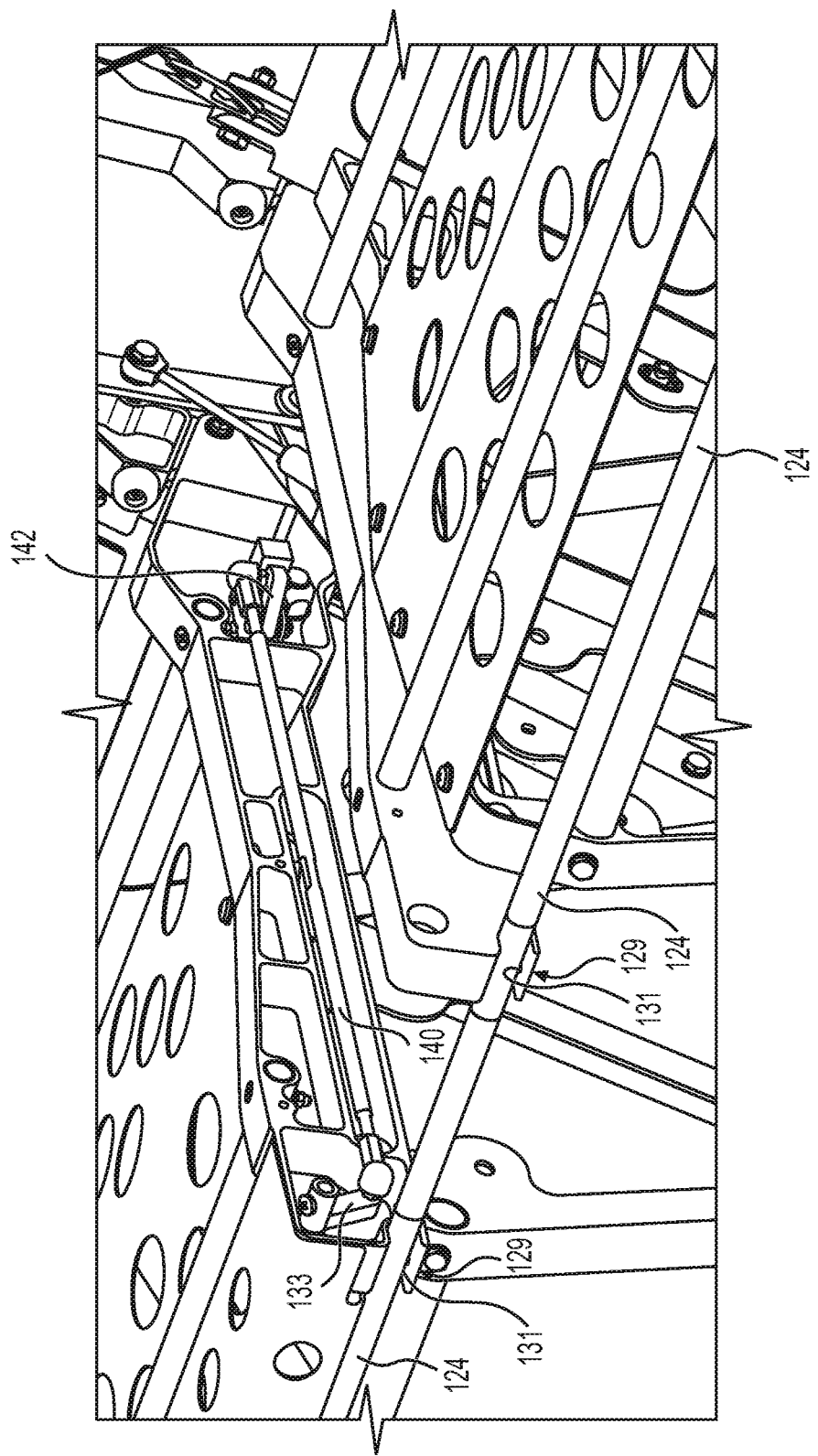
FIG. 9 shows a bar connection made between two seat frames as well as the portions of the release arrangement existing on the side of the seat frame.
Figure 10:
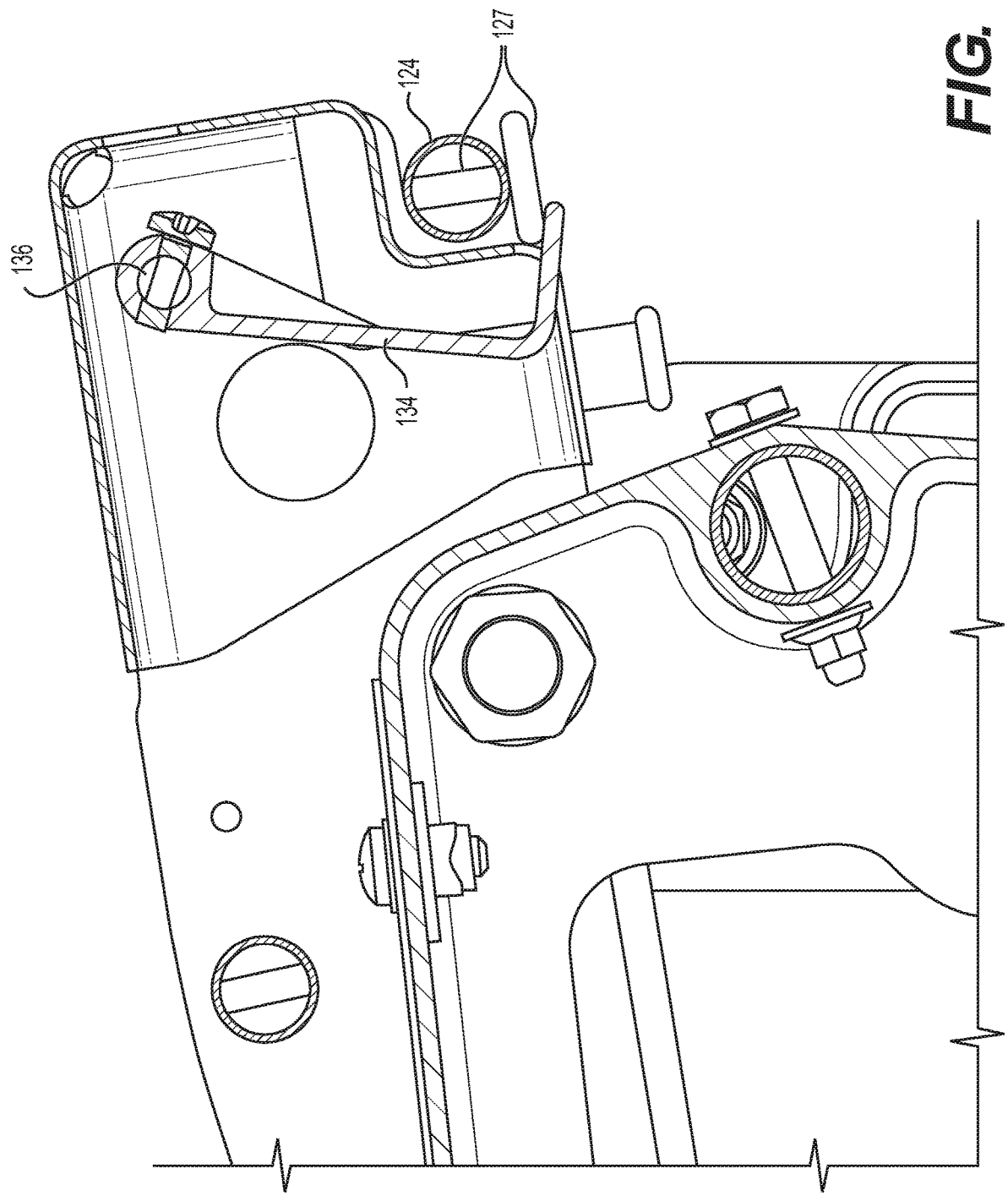
FIG. 10 shows a side cross sectional view of the handle and other components of the release system.

Each of seat backs 154, 156, and 158 include an upper pair of seat-back beams (e.g., beams 160 of middle seat 120), and a pivotally attached relative to a pair of lower seat-back beams 162 (see FIGS. 5A-5C). The upper portions of the lower beams 162 are overlapped by and are located inside of the insides of the lower portions of the upper beams 160 (see also FIG. 12 where a nested portion 201 of beam 160 is, when in chair mode, shown in FIG. 5A, included in a notched out area of beam 162). The beams 160 and 162 are coupled together by transversely connecting tubes 163. Referring to FIG. 12, a first upper tube 205 and a second lower tube 207 are both fixed between the upper beams 160. Second tube 207 exists (when in chair mode as shown in FIG. 12) in the nesting area created in the upper beam 160. A third tube 209 is fixed between the lower beams 162 and exists crosswise across the uppermost extent of the lower beams 162.

The beams 160 and 162 are also connected by outside arms 164 and 166. Arm 164 has a first pivot point 168 at one end made about a first location of beams 160, and a second pivot point 170 made about an upper portion of beam 162. Arm 166 has three pivot points. A first pivot point 172 is attached at a lower portion of the upper beam 160. A second pivot point 174 is made at a lower end of the beam 162. A third pivot point 176 is made to a rigid backward extension 178 of the base frame 107.

Figure 14:
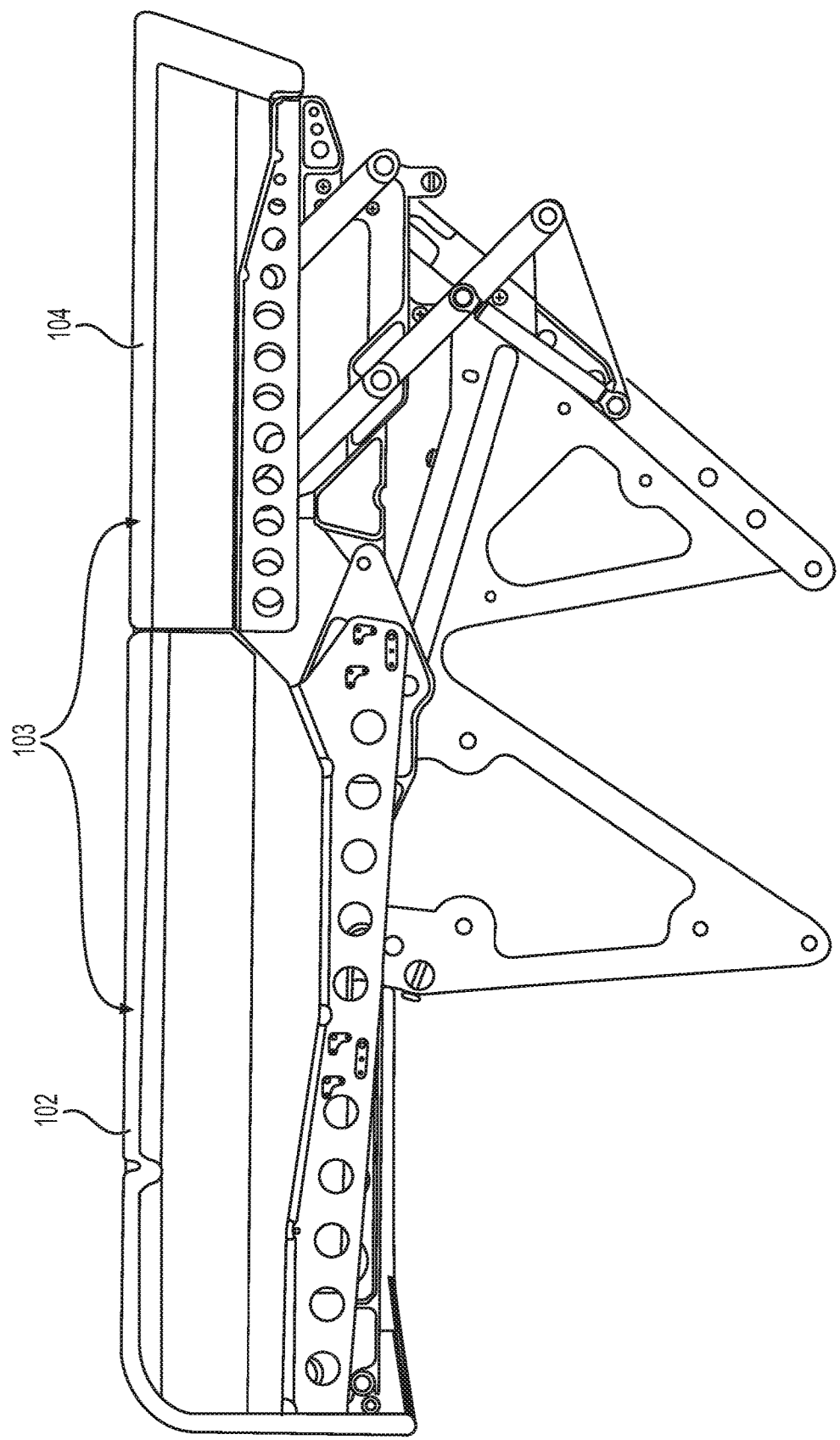
FIG. 14 is a cross sectional showing the frame with cushions in bed mode.

The functional result of the above mechanical arrangement is that, upon release, both beams 160 and 162 translate forward while rotating in a clockwise direction while at the same time arms 164 and 166 rotate slightly in a counter-clockwise direction (relative to the views shown in FIGS. 5A-5C) such that beam 160 is laid on top of the other beam 162, and an upper surface 180 in the folded up position is created from what was the back of the upstanding beam 160 to provide a bearing surface for the back cushion 104 so that both cushions together 102 and 104 define a substantially horizontal resting surface 103 (see FIG. 14).

A gas spring damping pin 182 is pivotally mounted between a pivot 184 on a portion of the stationary frame 178 and a second pivot 186 (see FIGS. 5A-5C) located on the lower beam 166 between the arm pivots 176 and 174. In FIG. 5 the gas spring is expanded when the chair back 156 is up, and is compressed between the stationary frame leg 110 (see FIG. 6) and the counter-clockwise rotation of the lower beam 166 when the chair is moved from chair mode to bed mode. Thus, the gas spring pin 182 acts against any angular rotation imposed during the folding up of the chair. The resistance provided causes the movement between seat and bed positions to be smooth, not abrupt.

Referring to FIG. 2, the system also includes a plurality of bearing bumpers 186, 188, and 190. Bumper 190 is located on the back side (see FIG. 2) of flange 190, and will engage beam 162 (see FIG. 6). Bumper 186, which is mounted on a portion 163 of the upper frame member 160 (see FIG. 6), will engage a surface 165 on frame member 160. Bumper 188, when the seat back is collapsed, engages flange 192. The bumpers 186, 188, 190, bear against reciprocating engagement surfaces beam 162, 165, and 192, cushion the frame members 160 and 162 against the base frame 107 as well as against each other when the system is in the bed position.

At the back of the stationary frame base seat platforms 128, 130, and 132 (see FIG. 2), belt lugs are provided for receiving seat belts. A pair of opposed lugs 194 are angled in a first direction. Holes (e.g., holes 215 in FIG. 13) are provided in each set of lugs (e.g., lugs 196) for receiving a pin arrangement (e.g., pin 213 in FIG. 13 for lug set 194) are provided for when the seats are installed on the left side of the aircraft, and a separate pair of oppositely-angled lugs 196 are provided for when the seats are installed on the right-hand side of the plane. Thus, belt configurations using pin attachment mechanisms can be attached to the lug sets (194 or 196) that allow for the proper seat location. This eliminates the need for separate right and left-hand side seat designs.

The position of the lug sets 194 and 196 at the upper back edge 217 of the stationary rigid support base 107, more specifically above and between the rearward laterally opposed V-shaped support members 110, makes it possible to stow the belts underneath the cushions in a compartment (not shown) so that when the cushions are in the bed position, the belts can be stowed underneath so as not to interfere with a prone passenger's comfort.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

The invention claimed is:

1. A system comprising:
a first seat frame and a second seat frame each including: (i) a base which is configured to be selectively securable to an aircraft floor, (ii) a translatable seat portion supported by the base, and (iii) a back portion;
a removable common linking member spanning across to secure the translatable seat portions together;
the translatable seat portions and back portions for each of the first and second frames being configured to move together between a first mode and a second mode upon the administration of a force applied to only the translatable seat portion of the first frame, the linking member causing the second translatable seat portion to move in concert with the first translatable seat portion when transitioning between the first and second modes.

2. The system of claim 1 wherein the common linking member is secured across the front of each of the translatable seat portions for the first and second frames.

3. The system of claim 2 wherein the common linking member is a bar that is receivable into receptacles formed into each of the first and second translatable seat portions, the bar, when secured, causing the seat portions to solely connect the first and second frame members.

4. The system of claim 2 wherein the first translatable seat portion includes a release system comprising:
a handle mechanically connected to a pin, actuation of the handle resulting in the pin being unseated from an aperture created in the first seat base enabling a forward translation of the first translatable seat portion.

5. The system of claim 4 wherein the first and second seat portions each have a glide-guiding arrangement comprising front and rear glide tracks created between the first and second seat portions and first and second frames respectively, the glide-guiding arrangement terminating forward movement of the first and second seat portions using one of a forward track end and a rear track end.

6. The system of claim 2, wherein the seat backs of each of the first and second frame members comprise:
an upper pair of laterally opposed seat-back beams interconnected by some transversely-extending members;
a lower pair of laterally opposed seat-back beams interconnected by other transversely-extending members, a lower portion of each of the lower beams being pivotally connected to a rear portion of the translatable seat portion;
a first pair of laterally opposed arms together presenting: (i) a first pivot point at a back upper fixed point on the chair base; (ii) a second pivot point near a middle area of each lower beam; and (iii) a third pivot point at a lower portion of the upper beams; and
a second pair of laterally opposed arms creating a lower pivot point at an upper portion of each of the lower beam members, and an upper pivot point on the upper beam at a location that is above the third pivot point created by the first pair of laterally opposed arms.

7. The system of claim 1 wherein the first mode enables the first and second frames to support one or more cushions in a seating position, and the second mode enables the first and second frames to support the one or more cushions such that they present a substantially horizontal resting surface for a bed.

8. A seat for aircraft, the seat comprising:
a frame removably attachable to from a floor of the aircraft;
a first set of seat belt lugs on the frame, each including an aperture, the apertures configured to receive the pins of a set of seat belts;
a second set of seat belt lugs on the frame, each including an aperture for receiving the set of seat belts;
the first set of seat belt lugs being acutely angled in a first direction accommodating the use of the set of seat belts when the seat is installed on a first side of the aircraft, and the second set of seat belt lugs being acutely angled in a second direction accommodating the set of seat belts when the seat is installed on a second side of the aircraft.

9. The seat of claim 8 wherein the seat is transformable between a first upright mode and a second collapsed bed mode.

10. A system for supporting an aircraft occupant, the system including a first frame, the first frame being convertible from an upright seat mode into a bed mode, the frame comprising:
a base which is configured to be secured to an aircraft floor;
a translatable seat portion configured to be moved in and out; and
a seat back including upper and lower portions, the seat back being mechanically connected to the translatable seat portion, the upper and lower portions being configured to rotate together on a plurality of hinge points thus collapsing to level the seat back when the translatable seat portion is moved out.

11. The system of claim 10 comprising:
a linking member which, when installed, spans between and connects the frame to a second frame, the second frame being substantially structurally and functionally the same as the first frame.

12. The system of claim 11 wherein the first and second frames are both actuated by a release system coupled with an administration of a force applied to the translatable seat portion of one of the first and second frames.

13. The system of claim 12, and the linking member, after actuating the release system, causes the second frame to move in concert with the first frame when transitioning between the seat and bed modes.

14. The system of claim 11 wherein the plurality of hinge points of the first frame are substantially axially in line with the plurality of hinge points of the second frame, allowing the first frame and second frame to move together when transitioning between the seat and bed modes.

15. The system of claim 11 wherein:
the upper portion of the seat back includes an upper pair of laterally opposed seat-back beams interconnected by some transversely-extending members;
the lower portion of the seat back includes a lower pair of laterally opposed seat-back beams interconnected by other transversely-extending members, a lower portion of each of the lower beams being pivotally connected to a rear portion of the translatable seat portion;
a first pair of laterally opposed arms together presenting: (i) a first pivot point at a back upper fixed point on the chair base; (ii) a second pivot point near a middle area of each lower beam; and (iii) a third pivot point at a lower portion of the upper beams; and
a second pair of laterally opposed arms creating a lower pivot point at an upper portion of each of the lower beam members, and an upper pivot point on the upper beam at a location above the third pivot point created by the first pair of laterally opposed arms.

16. The system of claim 10, the frame configured to, when introduced into bed mode, support a cushion arrangement such that a substantially horizontal resting area is presented.

* * * * *